United States Patent [19]

Baniak

[11] Patent Number: 5,618,018
[45] Date of Patent: Apr. 8, 1997

[54] CUP HOLDER FOR CONFINED SPACES

[75] Inventor: Grzegorz H. Baniak, Etobicoke, Canada

[73] Assignee: Manchester Plastics, Troy, Mich.

[21] Appl. No.: 479,652

[22] Filed: Jun. 7, 1995

[51] Int. Cl.⁶ .................................................. A47K 1/08
[52] U.S. Cl. ........................... 248/311.2; 248/292.14; 248/284.1; 224/483; 224/926; 296/37.12
[58] Field of Search .................... 248/311.2, 284.1, 248/292.14, 299.1, 278.1; 297/188.16; 224/483, 926; 296/37.12

[56] References Cited

U.S. PATENT DOCUMENTS

| | | | |
|---|---|---|---|
| 2,470,528 | 5/1949 | Sims | 248/311.2 X |
| 4,733,908 | 3/1988 | Dykstra et al. | 248/311.2 X |
| 4,826,058 | 5/1989 | Nakayama | 224/926 X |
| 4,907,775 | 3/1990 | Lorence et al. | 248/311.2 |
| 5,085,390 | 2/1992 | Murphy | 248/311.2 |
| 5,228,611 | 7/1993 | Yabuya | 248/311.2 X |
| 5,238,211 | 8/1993 | Borovski | 248/284.1 X |
| 5,297,709 | 3/1994 | Dykstra et al. | 248/292.14 X |
| 5,342,009 | 8/1994 | Lehner | 248/311.2 |
| 5,460,309 | 10/1995 | Nehl et al. | 224/483 X |

*Primary Examiner*—Carl D. Friedman
*Assistant Examiner*—Aimee E. McTigue
*Attorney, Agent, or Firm*—Bliss McGlynn, P.C.

[57] ABSTRACT

A container holding assembly (10, 10') for a vehicle includes a housing (12, 12') having an elongated vertical opening (14, 14') therein. A support member (16, 16') is movable into and out of the opening (14, 14'). The support frame (16, 16') includes a U-shaped frame (18, 18') supporting a rotatable container holder (22, 22'). The container holder (22, 22') pivots between a retracted position within the housing (12, 12') with the container holder (22, 22') planar with the U-shaped frame (18, 18') and an extend position with the container holder (22 22') transverse to the frame (18, 18').

18 Claims, 4 Drawing Sheets

CUP HOLDER FOR CONFINED SPACES

TECHNICAL FIELD

The subject invention relates to a beverage container holder, and particularly to cup holders which are designed for confined spaces for use in a vehicle.

BACKGROUND ART

Beverage cup holders are well known in vehicles. Many different types of such beverage cup holders exist which can be mounted in various locations within the vehicle. These cup holders are typically movable between a stowed or concealed position within a housing and an extended or use position removed from the housing.

U.S. Pat. No. 4,907,775 discloses a container holder which includes a frame slidable within a vertically extending housing, and movable between a vertical storage position and a horizontal operational position. A telescoping member establishes a rod which extends outwardly of the housing during operation, from which pivots the cup holder including an integral opening and base.

U.S. Pat. No. 4,907,775 does not disclose a cupholder assembly for holding a container having a housing defining a vertical slot, a support frame movable into and out of the problem with the prior art is that the use of an integral bottom support for supporting the bottom of a container is integral with the pivoting member and opening which requires an enlarged housing and wide vertical slot. The prior art fails to teach a narrow cup holder with suitable depth in the cup holding portion.

SUMMARY OF THE INVENTION AND ADVANTAGES

The invention comprises a container holding assembly for a vehicle. The assembly includes a housing defining an elongated vertical access opening; a support member movable into and out of the opening; container holder providing a container opening therein to receive a container and support member for rotating between extended and retracted positions; and the support member including at least one leg extending from a base, the leg rotatably supporting the container holder with the container pivoting between the retracted position with the container holder co-planar with the leg and base and the access opening, and the extended position with the container holder transverse to the leg.

An advantage of the present invention over the prior art is the elimination of a separate movable bottom support which decreases the dimension of the apparatus. Another advantage is the reduction of movable parts to thereby decrease operational complexity.

FIGURES IN THE DRAWINGS

Other advantages of the present invention will be readily appreciated as the same becomes better understood by reference to the following detailed description when considered in connection with the accompanying drawings wherein.

DETAILED DESCRIPTION OF THE EMBODIMENT

Figure 5:
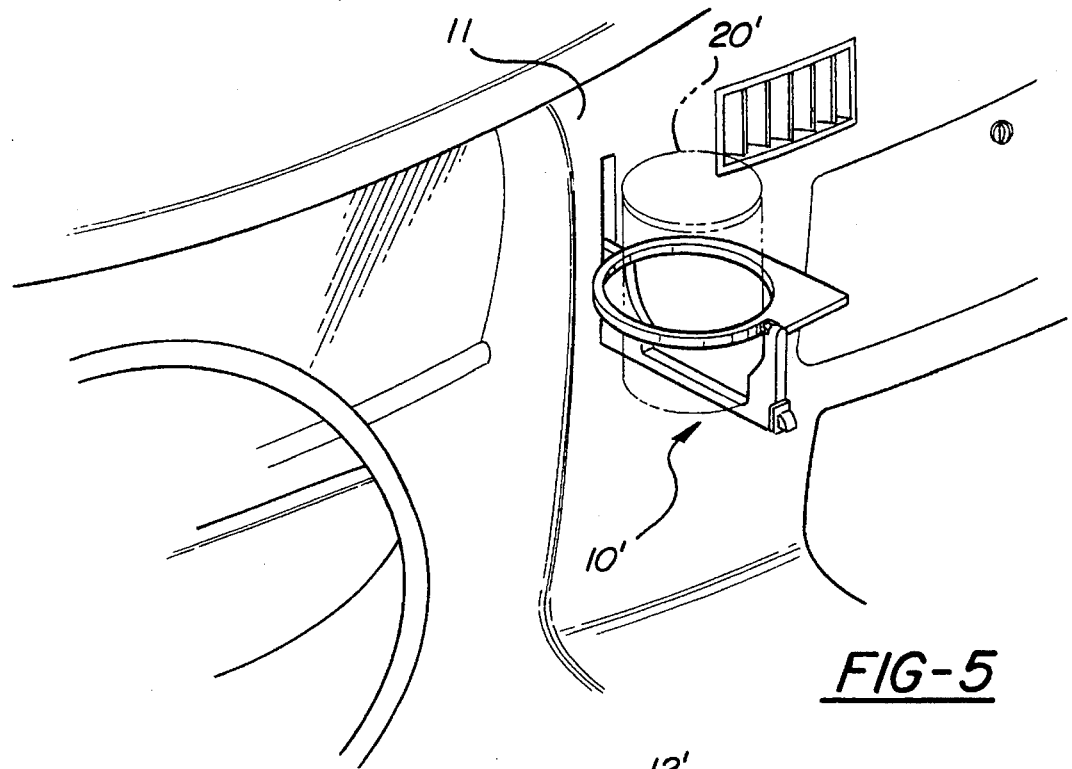
FIG. 5 is a perspective view of a second embodiment of the assembly in a vehicle environment.

A container holding assembly for use in a vehicle 11 is generally shown at 10, 10 ' in the Figures. As illustrated in FIG. 5, the assembly 10 is shown placed in the instrument panel of a vehicle 11, such as an automobile. However, it can be appreciated that the assembly 10, 10 ' may be located in other areas of a vehicle 11, such as a console, seat, door, etc.

Two embodiments 10, 10 ' are disclosed herein with the second embodiment utilizing primed reference numerals corresponding to the first embodiment. The common elements of the embodiments 10, 10 ' will first be discussed.

The assembly 10, 10 ' includes a housing 12, 12' for supporting and mounting of the assembly 10, 10 ' in a vehicle 11. The housing 12, 12' comprises a generally flat or narrow width rectangular shaped member 13, 13' having a height and depth substantially greater than its width. The housing 12, 12' includes a first end 15, 15' and second end 17, 17' at the longitudinal spaced ends of the rectangular member 13, 13'. In the preferred embodiments, the first end 15, 15' is positioned most inwardly in a vehicle 11 with the second end 17, 17' adjacent the outer surface of the vehicle support, i.e., instrument panel, substantially accessible by the user.

Figure 1:
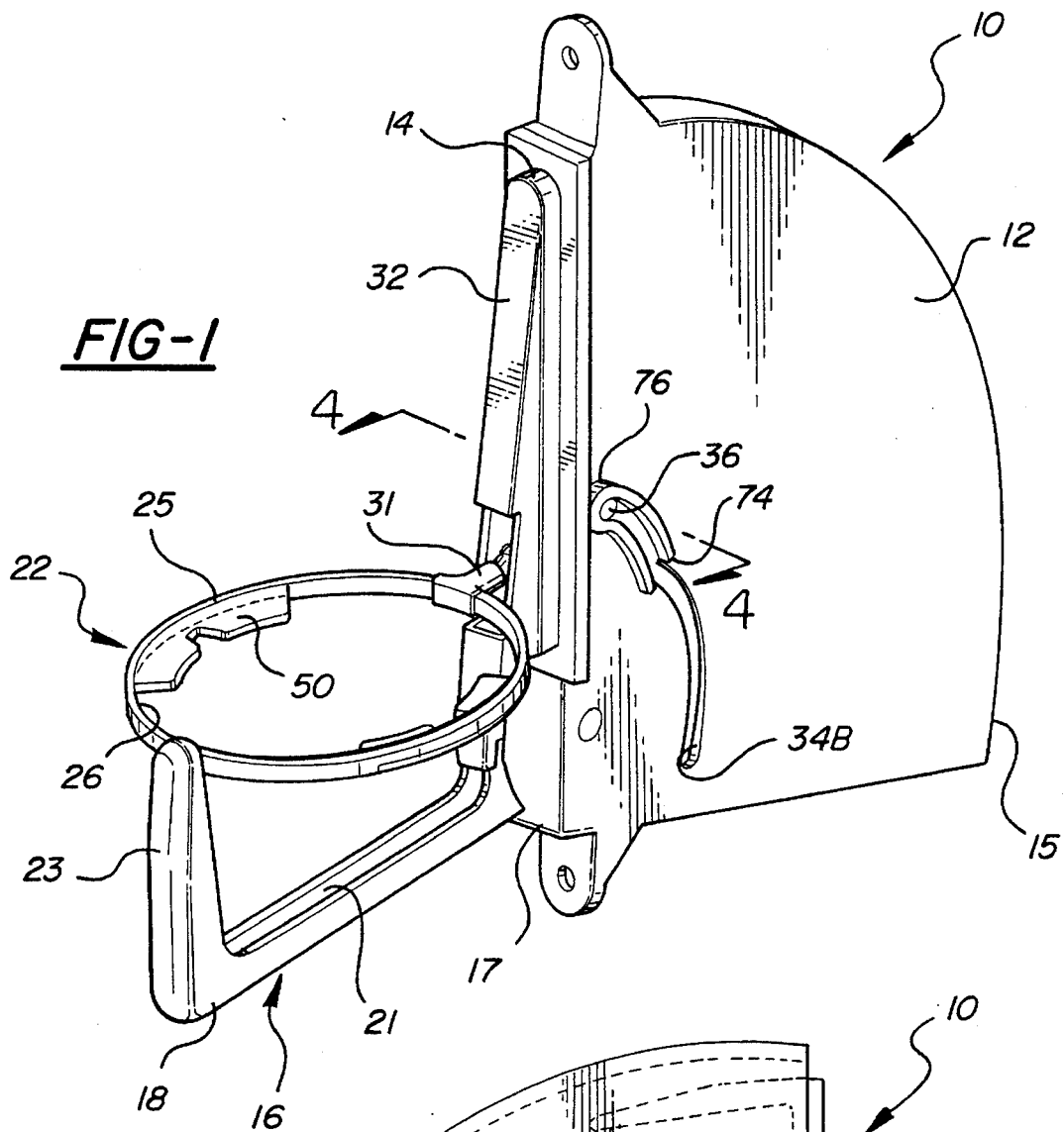
FIG. 1 is a perspective view of the subject invention shown in the extended position.
Figure 2:
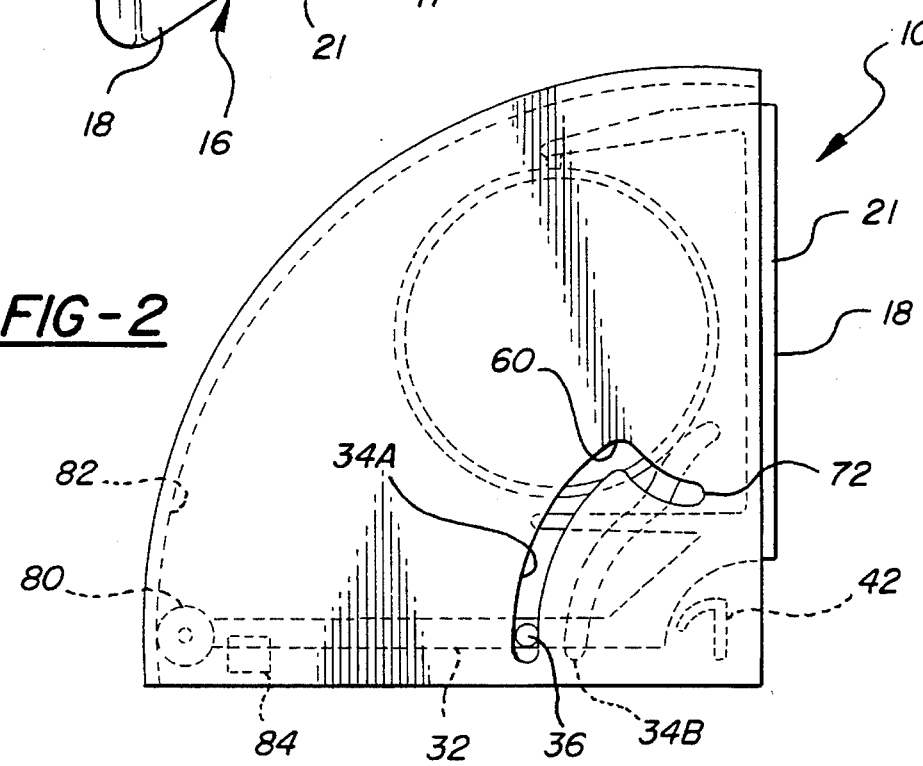
FIG. 2 is a side view of FIG. 1 in the stowed position.
Figure 3:
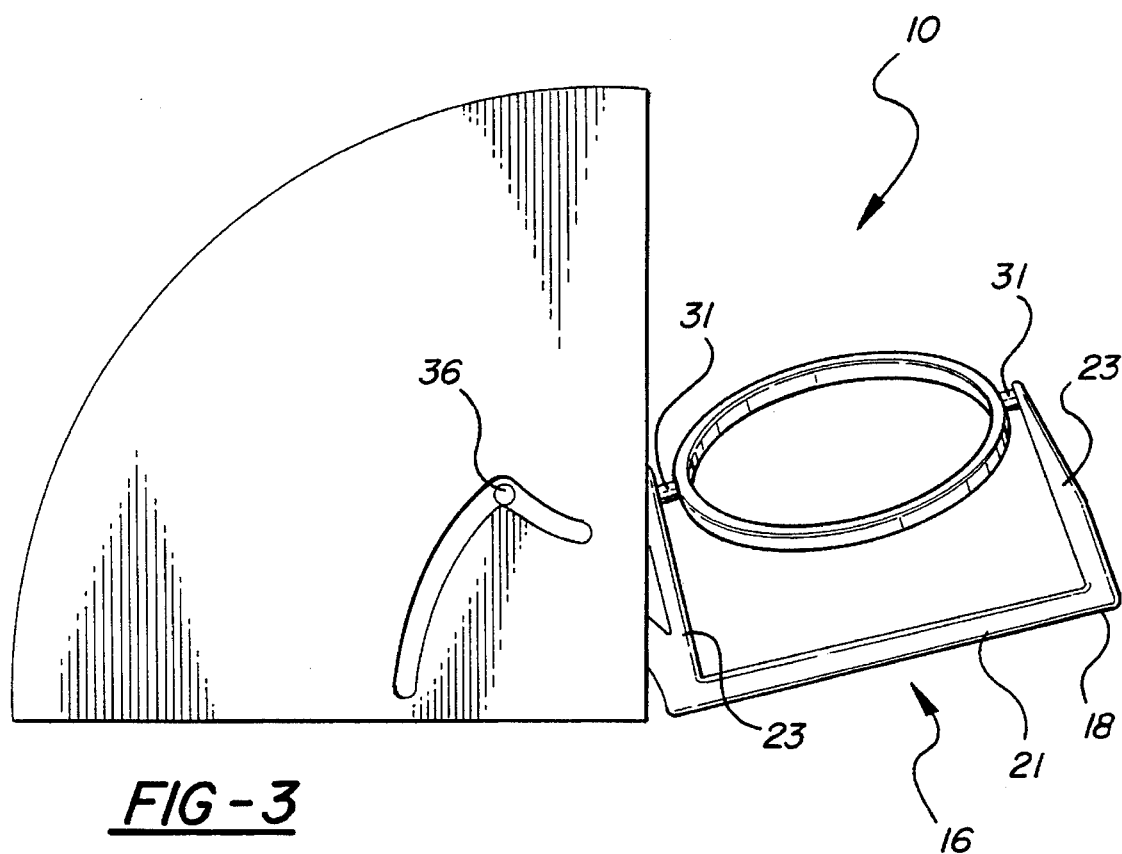
FIG. 3 is a side view of FIG. 1 in an intermediate opening position.
Figure 4:
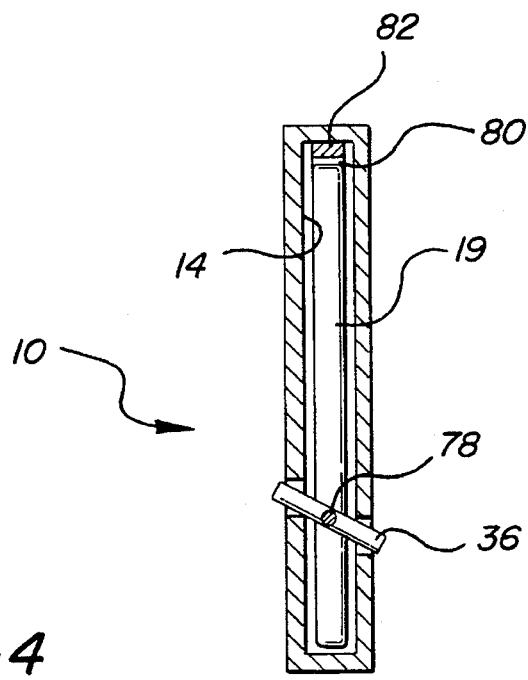
FIG. 4 is a cross-sectional view taken along lines 4—4 of FIG. 1.
Figure 6:
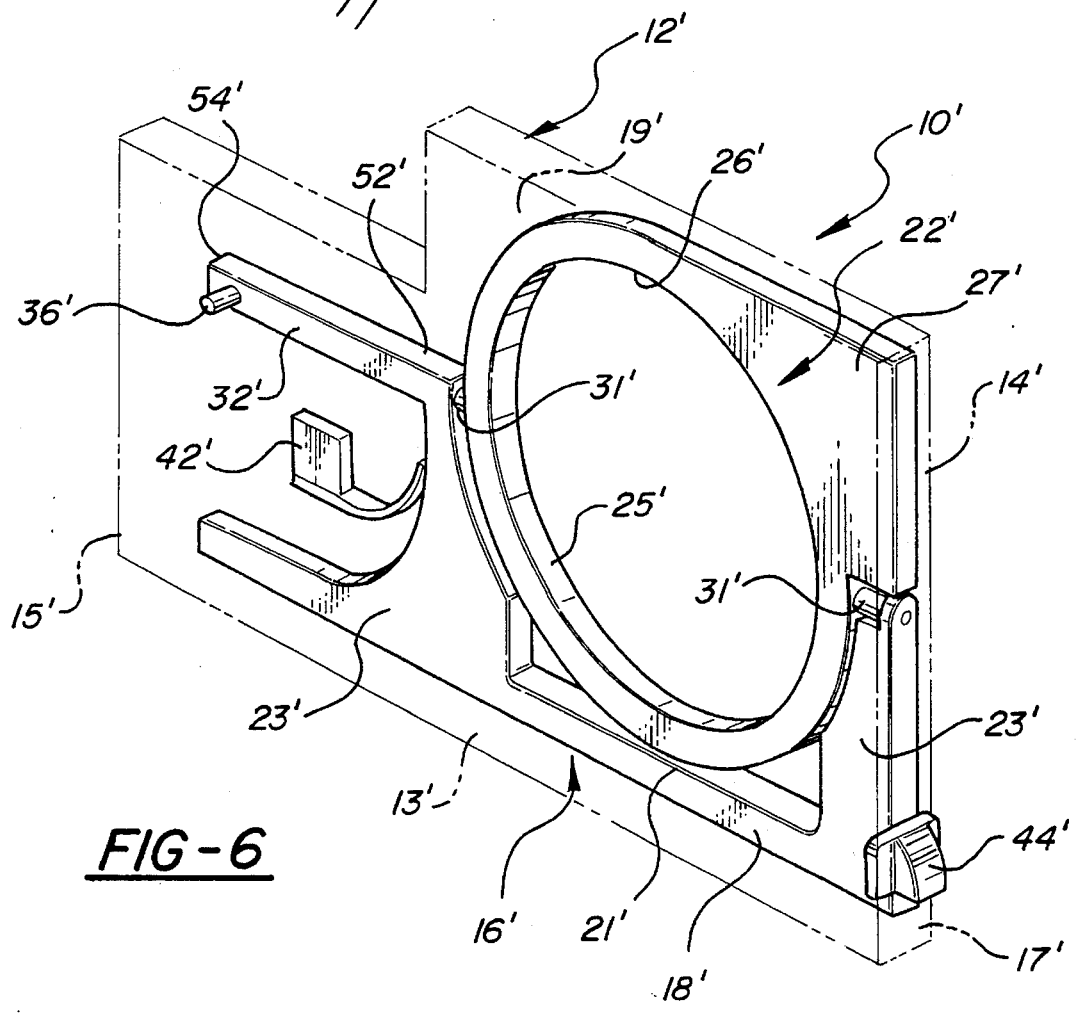
FIG. 6 is a perspective cut away view of a second embodiment of the stowed position.
Figure 7:
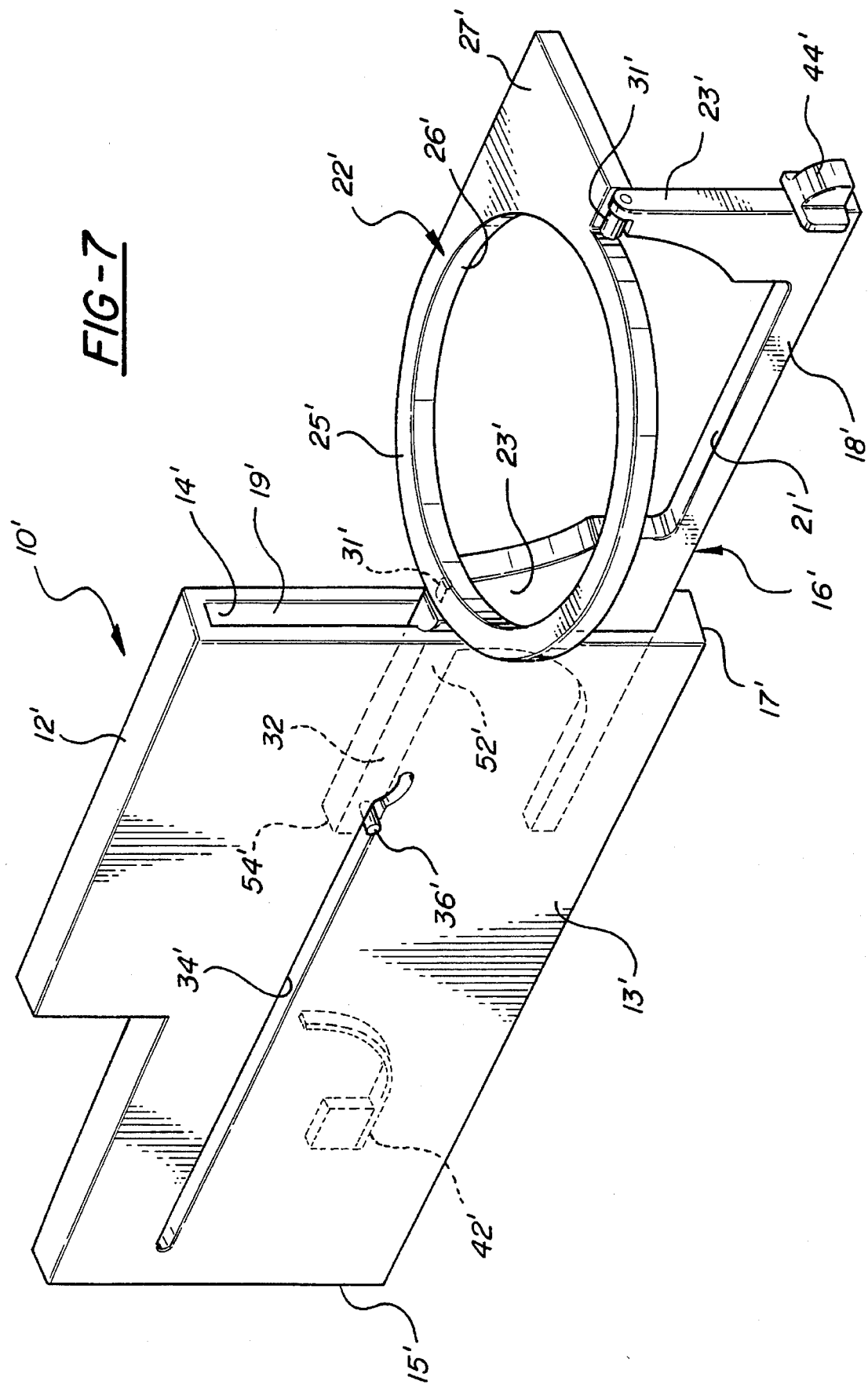
FIG. 7 is a perspective side view of the second embodiment in the extended position.

The housing 12, 12' includes an elongated vertical access opening 14, 14' in the second end 17, 17' thereof allowing access to as interior chamber 19, 19'. The opening 14, 14' generally lies in a first plane. The assembly 10, 10' also includes a support member 16, 16' movable into and out of the opening 14, 14' and interior chamber 19, 19' of the housing 12, 12' between a stowed, retracted position (FIGS. 2 and 6) and an extended, use position (FIGS. 1 and 7). The support member 16, 16' includes a generally U-shaped frame 18, 18' for support the bottom of a container 20, 20' in the extended position. The U-shaped frame 18, 18' provides a base 21, 21' and a pair of parallel legs 23, 23' on opposing sides of the base 21, 21'. The base 21, 21' supports the bottom of the container 20, 20' during use.

The assembly also includes a container holder 22, 22' rotatably supported by the legs 23, 23' of the frame 18, 18' spaced above the base 21, 21' for movement between the stowed position with the container holder 22, 22' co-planar with the frame 18, 18' and the opening of the access opening 14, 14' and the extended position perpendicular to the access opening 14, 14'. The container holder 22, 22' generally comprises a flat or narrow cylindrical or circular member 25, 25' (a planar rectangular flange 27' extends from a portion thereof in the second embodiment 10'). The cylindrical member 25, 25' provides a circular container opening 26, 26' therein to receive a container 20, 20'. The circular member 25, 25' may include a plurality of spaced flexible flanges 50 extending into the opening 26, 26' to steady a container 20, 20' therein, especially of lesser diameter than the opening 26, 26'. The container holder 22, 22' lies in the same plane as access opening 14, 14' and frame 18, 18' in the stowed position. The container holder 22, 22' lies in a plane different from the access opening 14, 14' and frame 18, 18' (perpendicular) in the extended position. In this manner, a container 20, 20' may be supported on the base 21, 21' of the frame 18, 18' while prevented from tipping by the container holder 22, 22'.

Attached on opposing sides of the cylindrical member 25, 25' along a diameter thereof are a pair of pins 31, 31', pivotally interconnecting the container holder 22, 22' to the upper end of the legs 23, 23'. The pins 31, 31', allow the container holder 22, 22' to pivot between the stowed and extended positions.

The support member 16, 16' also includes a guide member 32, 32' operatively connected to the housing 12, 12' for guiding the support member 16, 16' into and out of the opening 14, 14'. The guide member 16, 16' may be integral with the frame 18, 18' and extends with the first leg 23, 23' in the first plane. The guide member 32, 32' extends between first and second ends 52, 54, 52' 54', with the first end 52, 52' connected to the first leg 23, 23' from between the first 15, 15' and second 17, 17' ends.

The guide member 32, 32' differ in specific design in each embodiment 10, 10'. Each embodiment 10, 10' is separately discussed, through the overall function is similar between embodiments.

In the first embodiment 10, the guide member 32 extends upwardly from the first leg 23 to the second end 54, i.e., the guide member 32 extends straight from the first leg 23. The guide member 32 includes a guide pin 36 pivotally connected adjacent to the first leg 23. The pin 36 is located approximately in the same horizontal position as the circular member 25 across the leg 23 and guide member 32. The housing 12 includes two guide slots 34A, 34B opposing one another on each of the planar surfaces thereof. The first guide slot 34A extends generally arcuately upwardly from the bottom or base of the housing 12, and includes an elbow 60 wherein the slot 34A angles back downwardly at approximately a 45° angle to a horizontal end portion 72. The second guide slot 34B includes a generally arcuate portion similar to the first guide slot 34A, but positioned near to the access opening 14. At an elbow 74, the slot 34B extend at approximately a 45° angle upwardly therefrom along a second arc rounding to a horizontal end slot 76. The guide pin 36 extends from a pivot shaft 78 connected to the edge of the guide member 32 and includes two ends which are received in the slots 34A and 34B.

The second end 54 of the guide member 32 includes a rotatable pinion gear 80 connected thereto which has a damping characteristic. The gear 80 rides along a toothed track 82 to guide the guide member 32 into and out of the housing 12, and control movement toward the use position at a slow speed. Also included is a push or toggle latch 84 connected in the housing 12 at the first end 15 which engages the second end 54 of the guide member 32 for locking the container holder 22 in the stowed position. Upon slight pushing in of the container holder 22 from the stowed position, release of the latch 84 occurs to allow the container holder 22 to move to its extended position. The container holder 22 may be spring biased to its extended position by spring 42. Such type of latch 84 is commonly known in the art.

In operation the user merely pushes on the container holder 22 to force it further into the housing 12 which causes release of the latch 84. The container holder 22 and the guide member 32 rotate out of the housing 12 in a downwardly arcuate direction with the guide pin 36 controlling movement of the circular member 25. Once the circular member 25 has fully cleared the access opening 14, it is automatically rotated to the horizontal position and the base 21 continues to pivot downwardly to a horizontal supporting position.

In the second embodiment 10' the guide member 16' extends horizontally into the housing 12' substantially perpendicular to the first leg 23'. The second end 54' of the guide member 16' includes a guide pin 36' extending outwardly from or transverse to the first plane. The housing 12' includes a generally horizontally extending guide slot 34' as illustrated in FIG. 7. The guide pin 36' extends into the horizontal slot 34' to guide the support member 16' along a predetermined (horizontal) path into and out of the housing 12'. A spring 42' is connected to the housing 12' and operatively to the guide member 32' for biasing the support member 16' to the extended position. The spring 42' generally comprises a leaf spring. A handle 44' is connected to the second leg 23' for facilitating the movement of the support frame means 16 out of the opening 14'. The slot 34' is uniquely shaped to provide rotary motion.

Operation of the assembly 10' is as follows. Initially, the support member 16' is in the retracted or stowed position within the opening 14' and chamber 19' of the housing 12'. The container holder 22' is planar with the frame 18' as illustrated in FIG. 6. The handle 44∴ is then pulled to move support member 16' from the stowed position to the use position. After support member 16' is in the use position, the circular member 25' may be rotated from the storage position to the stabilizing use position. In the use position, the container 20' can be supported within opening 26' and resting on the base 21'.

To return the support member 16' to the retracted stowed position, the container holder 22' is rotated to be co-planar with the frame 18'. After the 24' is in the storage position, the support member 16' may be moved or slid into the retracted position.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that with in the scope of the appended claims the invention may be practiced otherwise than as specifically described.

What is claimed is:

1. A container holding assembly for a vehicle comprising:

a housing defining an elongated vertical access opening;

a support member movable into and out of said opening;

container holder providing a container opening therein to receive a container and supported by said support member rotating between an extended position and a retracted position; and said support member including at least one leg extending from a base, said leg rotatably supporting said container holder with said container holder pivoting between said retracted position with said container holder co-planar with said leg and said base and said access opening with at least a portion of said container holder rotated to a position adjacent said leg and said base, and said extended position with said container holder transverse to said leg.

2. An assembly as set forth in claim 1 wherein a pair of legs extend from said base opposing one another and parallel with one another.

3. An assembly as set forth in claim 2 wherein said support member comprises a substantially U-shaped frame including said pair of legs and said base.

4. An assembly as set forth in claim 2 further including a pair of opposing pins connected on opposite sides of said container holder and connected to said pair of legs for allowing said container holder to be rotatably supported between said pins allowing pivoting of at least a portion of said container holder to a position adjacent said base.

5. An assembly as set forth in claim 1 wherein the housing comprises a generally flat rectangular shaped member having a height and depth substantially greater than its width, said elongated vertical access opening extending through the height within the width.

6. An assembly as set forth in claim 1 wherein said container holder comprises a substantially flat circular member having said container opening therethrough rotatably supported on said leg, so that said container opening is maintained and undistorted during rotation between said extended position and said retracted position.

7. An assembly as set forth in claim 6 further including a least one pin interconnecting said container holder and said leg for allowing pivoting movement of said container of said container holder with respect to said leg.

8. An assembly as set forth in claim 1 wherein said support member includes a guide member operatively connected to said housing for guiding said support member into and out of said access opening between said retracted position and said extended position.

9. An assembly as set forth in claim 8 wherein said guide member comprises a guide pin extending into said, housing, said housing including a substantially horizontal slot for receiving said guide pin and for allowing sliding of said support member substantially horizontally out of said access opening.

10. An assembly as set forth in claim 8 wherein said guide member includes a guide pin connected to said leg, said housing including a generally upwardly extending arcuate guide slot for receiving said guide pin to rotate said guide member arcuately and vertically out of said access opening.

11. An assembly as set forth in claim 8 wherein said guide member includes a guide pin operatively connected to said container holder for allowing said support member to pivot in and out of said opening along a first axis and to guide said container holder to pivot from said retracted position to said extended position about a second axis.

12. An assembly as set forth in claim 1 wherein said container holder is comprised of a planar element which remains continuously planar during movement between said extended position and said retracted position.

13. An assembly as set forth in claim 1 wherein said container holder provides a circular container opening which opening is maintained during movement between said extended position and said retracted position.

14. An assembly as set forth in claim 13 wherein said container holder is formed of an integral circular member.

15. An assembly as set forth in claim 1 further including a pivot pin operatively connected between said leg and said container holder, and substantially half of said container holder extends on opposite sides of said pivot pin in both said extended position and said retraction position.

16. A container holding assembly for a vehicle comprising:

a housing defining an elongated vertical access opening;

a support member movable into and out of said opening;

container holder providing a container opening therein to receive a container and being pivotally connected to said support member rotating between an extended position and a retracted position, and a guide member operatively connected between said housing and said support member for guiding said support member into and out of said access opening between said retracted position and said extended position such that as said support member pivots in a first direction about a first axis with respect to said housing, said container holder is controlled by said guied member to rotate in a second direction different from said first direction with respect to said support member about a second axis transverse to said first axis between said retracted position with said container holder coplanar with said access opening, and said extended position with said container holder transverse to said access opening.

17. An assembly as set forth in claim 11 wherein said guide member includes a guide pin in one of said support member or said housing, and an elongated slot in the other of said housing or said support member receiving said guide pin for controlling rotation of said support member between said extended position transverse to said access opening and said retracted position co-planar with said access opening.

18. An assembly as set forth in claim 17 wherein said slot comprises a non-linear slot to control rotation of said support member.

* * * * *